(12) United States Patent
Brunner et al.

(10) Patent No.: US 8,378,238 B2
(45) Date of Patent: Feb. 19, 2013

(54) PROTECTIVE SLEEVE TO BE ARRANGED BETWEEN TWO ASSEMBLY ELEMENTS FOR PASSING THROUGH CABLES/LINES OR THE LIKE IN PROTECTIVE FASHION AND METHOD FOR ITS PRODUCTION

(75) Inventors: Johann Brunner, Neumarkt-St. Veit (DE); Erich Blumberg, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 762 days.

(21) Appl. No.: 12/312,049

(22) PCT Filed: Oct. 15, 2007

(86) PCT No.: PCT/EP2007/060953
§ 371 (c)(1),
(2), (4) Date: Nov. 19, 2009

(87) PCT Pub. No.: WO2008/049751
PCT Pub. Date: May 2, 2008

(65) Prior Publication Data
US 2010/0059152 A1    Mar. 11, 2010

(30) Foreign Application Priority Data
Oct. 26, 2006 (DE) .................... 10 2006 050 544

(51) Int. Cl.
*H02G 3/18* (2006.01)

(52) U.S. Cl. .............. 174/650; 174/152 G; 174/153 G; 174/152 R; 16/2.1; 16/2.2; 248/56

(58) Field of Classification Search .................. 174/650, 174/152 G, 152 R, 153 G, 135, 17 CT, 151, 174/142, 72 R, 88 R, 654, 658, 153 R; 16/2.1, 16/2.2; 439/604, 587, 274, 275; 248/56
See application file for complete search history.

(56) References Cited

U.S. PATENT DOCUMENTS 6,901,627 B2 * 6/2005 Uchida ..................... 174/135
(Continued)

FOREIGN PATENT DOCUMENTS

| DE | 3500358 A1 | 7/1986 |
| DE | 10140714 A1 | 3/2003 |

(Continued)

*Primary Examiner* — Angel R Estrada
(74) *Attorney, Agent, or Firm* — Wolf, Greenfield & Sacks, P.C.

(57) ABSTRACT

Bush to be arranged between two fitting elements for passing through cables, lines or the like in protected fashion, comprising an elongate, hose-shaped bush body (10) with a substantially linearly running central section (11) and heads (12, 13) at the ends, wherein the heads (12, 13) form a first inner circumferential face (20) at their open ends and a latching device (14, 15) for knocking the bush into installation openings in the fitting elements (M) is formed on each of the heads (12, 13) and integrally therewith, which latching device has a circumferential web (16) with at least one latching hook (17), which is formed thereon and has at least one radially outer latching tab (18), wherein the web forms a second inner circumferential face (19) opposite the latching tab (18), characterized in that the bush body (11) is formed from rubber and the latching devices (14, 15); are formed from hard-elastic plastic, and in that at least one of the second inner circumferential faces (19) is configured in such a way that it runs radially out of alignment with the corresponding first inner circumferential face (20).

10 Claims, 3 Drawing Sheets

U.S. PATENT DOCUMENTS

| | | | |
|---|---|---|---|
| 7,020,931 B1 * | 4/2006 | Burnett et al. | 174/153 G |
| 7,098,402 B2 * | 8/2006 | Suzuki | 174/153 G |
| 7,100,237 B2 * | 9/2006 | Katayama | 16/2.1 |
| 7,943,854 B1 * | 5/2011 | Lipp | 174/152 G |
| 7,952,032 B2 * | 5/2011 | Suzuki | 174/152 G |
| 2003/0061680 A1 | 4/2003 | Uchida | |
| 2006/0086524 A1 | 4/2006 | Suzuki | |

FOREIGN PATENT DOCUMENTS

| | | |
|---|---|---|
| DE | 102 44 408 A1 | 4/2003 |
| EP | 1157894 A | 11/2001 |
| EP | 1158637 A | 11/2001 |
| FR | 2883109 A | 9/2006 |
| JP | 2001132871 A | 5/2001 |

* cited by examiner

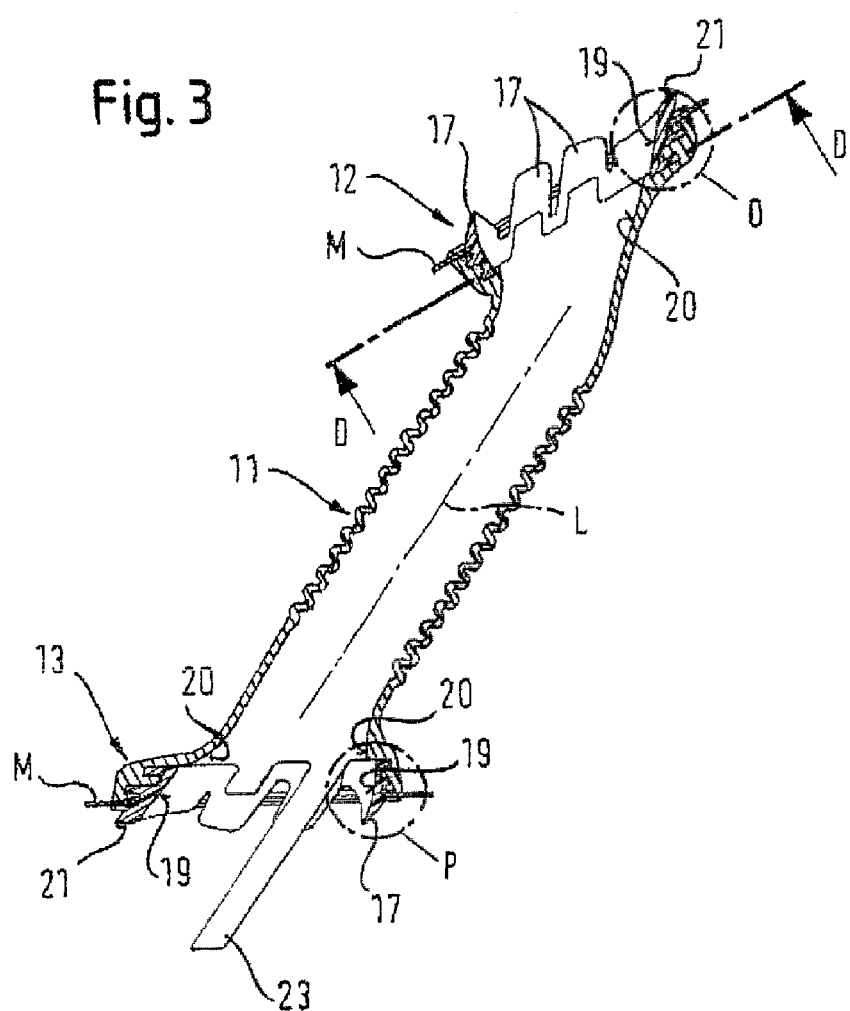
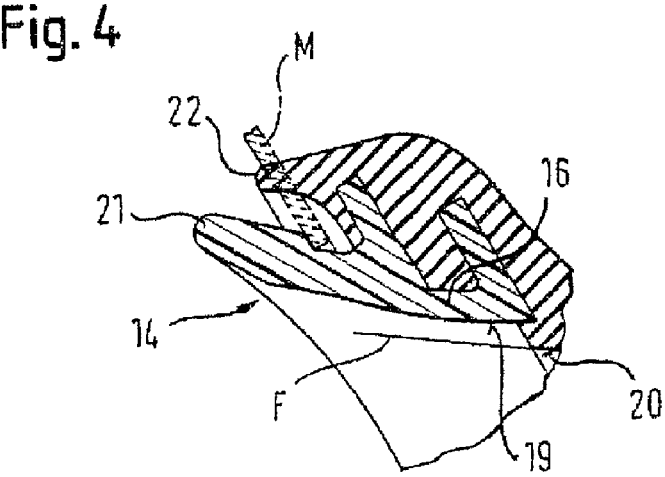

PROTECTIVE SLEEVE TO BE ARRANGED BETWEEN TWO ASSEMBLY ELEMENTS FOR PASSING THROUGH CABLES/LINES OR THE LIKE IN PROTECTIVE FASHION AND METHOD FOR ITS PRODUCTION

FIELD

The present invention concerns a protective sleeve to be arranged between two assembly elements for passing through cables/lines or the like in a protected fashion and a method for its production. For example it concerns a protective sleeve for installation in motor vehicles and in particular between assembly elements such as the door or hatch and the body work. The present invention concerns in particular protective sleeves having an elongated tubular sleeve body having a central portion and head portions provided at its ends as well as a locking means for fixing ("buttoning in") the protective sleeve in assembly openings of the assembly elements at each of the heads and integrally formed therewith, wherein the locking means comprise a circumferential rib (ridge) having at least one engagement hook formed thereon, which comprises at least one detent situated radially outside.

BACKGROUND

Such protective sleeves are known for example from DE 33 40 664 A1 and DE 100 58 563 A1. Here, the sleeve body is made of a flexible plastic material, preferably a thermoplastic elastomer, and the locking means are made of hard-elastic (energy-elastic) plastic, preferably a polypropylene. In order to manufacture such a protective sleeve, the sleeve body is first formed in an injection molding tool, for example, and in a subsequent method step the hard components, that is the locking means, are molded onto the sleeve body. This production sequence allows to remove the core necessary for forming the elongated tubular sleeve body before the locking means are molded or formed thereon.

SUMMARY

Moreover, from the prior art, there are known protective sleeves to be arranged in an assembly opening of an assembly element for passing cables/lines or the like through the assembly element, which do not comprise a substantially elongated tubular sleeve body having a central portion and two heads, in contrast to the protective sleeves of the present invention, but merely have a sleeve body that is fixed in (buttoned into) the assembly opening so as to allow the passage of cables, lines or the like through the opening. It is for example known from DE 101 40 714 C2 to configure such protective sleeves as a two-component part, wherein the sleeve body is made of rubber, for example EPDM, and the locking means is made of a hard-elastic plastic, preferably a fiber reinforced polyamide. This combination of materials has the following advantages over the use of two thermoplastic resins: on the one hand, the tools may be manufactured more cheaply, leading to lower part or product prices. Moreover, rubber has a higher compression set (resilience) as compared to a thermoplastic resin. The tightness, in particular the water tightness to be provided by the protective sleeve when installed in the vehicle, may thus be secured even with extremely high requirements. In this respect, it is to be noted that the protective sleeve illustrated in the below described preferred embodiments is a protective sleeve for insertion between the hatch and the body work. This protective sleeve must ensure tightness towards the interior in the area of the water gutter. The entire rain water flows backwards over the roof and into the water gutter so that substantial amounts of water appear at this point. In order to prevent penetration, the protective sleeve must satisfy increased tightness requirements. A further technical advantage is the better demoldability of the rubber parts from the tool as the rubber may be expanded for demolding.

The above-described protective sleeves are produced as follows. In a first production step the locking means or the component forming the locking means is formed, for example injection-molded, from hard-elastic plastic. This component is introduced as insert into a further mold and is over-molded with rubber. So, in contrast to the above-described protective sleeves, the locking means is formed first and is then over-molded with the sleeve body. In protective sleeves such as those described in DE 10 140 714 C2, this method does not lead to problems because the core necessary for forming the sleeve body can always be pulled out of, and thus removed from, the end opposite to the locking means. To that end, the cores are mostly connected to a compressed air device by means of which the sleeve body can be inflated or widened so that the core can easily be removed.

If locking means made of hard-elastic plastic are provided at both open ends of the sleeve body or its heads, the removal of the core is, however, problematic. A particular problem arises if the heads are inclined relative to the longitudinal extension of the central portion. Therefore, the materials known from DE 10 140 714 C2 have hitherto not been transferred to protective sleeves as described at the beginning.

Consequently, it is an object of the present invention to provide a protective sleeve to be arranged between two assembly elements, in which the sleeve body is made of rubber and the locking means arranged at both ends of the sleeve body are made of hard-elastic plastic, as well as to provide a method for its production.

According to the invention, this object is achieved by means of a protective sleeve having the features of claim 1 as well as a method according to claim 11. Preferred embodiments of the present invention are defined in the dependent claims.

The present invention is based upon the notion to configure the opening cross-section of the locking means relative to the cross-section of the tubular sleeve body in such a way that, on the one hand, the opening cross-section is larger than the maximum cross-section of the sleeve body in the longitudinal direction of the sleeve body or of the central cross-section, and, on the other hand, to configure it such that the removal of the core from the tubular sleeve body is possible in a simple way, preferably by a substantially translational movement. Moreover, the combination rubber/plastic allows that an extremely small clearance between the bellows (gaiter) height and the inner width (clear diameter) of the plastic frame forming the locking means with the circumferential rib and the engagement hook(s) is achieved while still enabling the protective sleeve to be demolded. This is made possible in particular by means of the stretchability (elasticity) of the rubber upon demolding.

According to the invention, this is achieved by means of a protective sleeve to be arranged between two assembly elements for passing through cables/lines or the like in a protected fashion, comprising an elongated tubular sleeve body having a head at each of both opposite ends and a locking means for buttoning the protective sleeve into an assembly opening of the assembly elements at each of the heads. According to the invention, the locking means are formed integrally with the sleeve body, preferably as a two-component part. This can be effected in a two-component injection molding method, for example. The elongated tubular sleeve body has a substantially linear central portion between its two heads, and the heads form a first inner peripheral surface at their open end. Likewise, the locking means comprises a circumferential rib (ridge) having at least one engagement hook formed thereon, which comprises at least one detent situated radially outside, wherein the rib forms a second inner peripheral surface opposite to the detent. The sleeve body is formed of rubber and the locking means are formed of hard-elastic plastic. Further, at least one of the two inner peripheral surfaces, that is the inner peripheral surface of at least one of the locking means, is configured at one of the heads in such a way that it runs radially outside of the alignment corresponding to the first inner peripheral surface, that is the first inner peripheral surface of the head abutted by the second inner peripheral surface. The first and second inner peripheral surfaces are arranged one after the other via an interface. In other words, the imaginary extension of the first inner peripheral surface, projected by the circumferential rib of the locking means, does not intersect the second inner peripheral surface. Moreover, the engagement hook is configured so as to be elastic in a radial direction such that it can elastically retreat to the outside upon removal of the core when it intersects the imaginary extension of the first inner peripheral surface.

Further, the configuration of a protective sleeve comprising locking means provided on both sides and made of hard-elastic plastic, and comprising a sleeve body made of rubber, in which the heads are arranged in an inclined manner relative to the longitudinal axis of the central portion, is particularly problematic. This inclination leads to the second inner peripheral surface of the locking means having to be formed at least in sections in an inclined manner relative to the assembly elements into the assembly opening of which the protective sleeve has to be buttoned in. Therefore, also the engagement hooks must be formed so as to be inclined in respect thereto. Surprisingly, it turned out that such an oblique or inclined alignment of the engagement hooks does not lead to any disadvantage regarding the holding force of the protective sleeve in the assembly openings, but actually increases them. Moreover, the inclined arrangement of the heads relative to the central portion has the advantage of reducing the cross-section of the protective sleeve with respect to its maximum cross-section. The reduction of the maximum cross-section of the protective sleeve entails that the entire protective sleeve can be led through openings more easily. This is particularly important in those cases in which the protective sleeve is already premounted to a cable set (harness) and has to be installed in this way, for example into a motor vehicle, to which end the protective sleeve has to be threaded through one or more openings before it can be buttoned (fixed) at its final predetermined location.

Preferably the inner peripheral surface is configured so as to be radially offset to the outside and substantially aligned with the corresponding first inner peripheral surface. In other words, this means that in a cylindrical configuration of the first inner peripheral surface, for example, the second inner peripheral surface concentric to the first inner peripheral surface is also cylindrically formed, but has a somewhat larger diameter than the cylinder forming the first inner peripheral surface. The same applies also if the first inner peripheral surface has an oval cross-section, for example. In such a case also the second inner peripheral surface would be formed so as to have a substantially oval cross-section. In this respect, the term "substantially" is to be understood so that the cross-sections of the inner peripheral surface shall only be substantially equal, but that small deviations therefrom may be present, too, as long as the second inner peripheral surface runs outside the alignment of the first inner peripheral surface, as defined above. Thus, the term "radially offset to the outside and in alignment" is to be understood to mean that the cross-sectional shapes are substantially equal, but that the cross-section of the second inner peripheral surface runs radially outside of the cross-section of the first inner peripheral surface.

As already mentioned above, the sleeve body is configured so as to have a preferably flat, in particular oval or elliptical cross-section. In such a case, it is preferred that at least two of the opposing portions, that is the shorter or longer sides or portions of the flat cross-section are radially offset to the outside with respect to the portions of the corresponding first inner peripheral surface, and are aligned. In particular, the portions of the second inner peripheral surface abutting the opposite ends of a cross-sectional axis of the cross-section of the first inner peripheral surface, which is arranged in a plane intersecting the longitudinal axis of the central portion, are aligned.

Further, it is preferred that the engagement hook is formed on a portion of the rib defining the portions of the second inner peripheral surface corresponding to the shorter or longer sides. This is in particular due to the oblique configuration of the engagement hook surprisingly providing an improved retention in the assembly opening of the assembly element, as mentioned above.

Further, it is of advantage if a hang-in hook is provided diametrically opposite to the engagement hook. This simplifies assembly substantially as the locking means is hung at a lower portion of the assembly opening by means of the hang-in hook and is then pivoted around the periphery of the assembly opening with the hang-in hook as pivot until the engagement hook engages the periphery of the assembly opening and secures or locks the protective sleeve.

Preferably, the second inner peripheral surface is situated between 1.5 and 2.5 mm radially to the outside of the first inner peripheral surface. Preferably, this applies for each location of the surface. This means that if the first inner peripheral surface is projected into the second inner peripheral surface, then the distance between those two surfaces at each position is in the range between 1.5 and 2.5 mm. Here, the distance may be configured so as to be equal at each position (equal cross-section), or alternatively to be configured differently (varying cross-section).

In order to enable the pulling out of the core in a substantially translational direction after the overmolding of the locking means with rubber, the second inner peripheral surface is preferably provided so as to substantially run in parallel to the longitudinal axis of the central portion.

Moreover, it is preferred that both second inner peripheral surfaces, that is the second inner peripheral surface of the first locking means at the first head and the second inner peripheral surface on the second locking means at the second head, are configured alike.

In the present invention, the locking means made of hard-elastic plastic is introduced as insert into a molding tool and is overmolded with rubber at very high temperatures (180 to 200° C.). Therefore, the hard-elastic plastic must be a high temperature-resistant plastic which moreover must keep its elastic properties so that the locking of the protective sleeve works flawlessly. Therefore, polyamide reinforced with 14% of glass fiber is preferably used. An example for such a plastic is Zytel® of DuPont, which is a polyamide of Nylon 66 with 14% of glass fiber.

Moreover, it is preferred that the heads form, at their open ends, at least one sealing lip circumferentially extended radially outside of the rib in order to seal the protective sleeve against the assembly element and to inhibit passage of a medium from one side of the assembly elements to the other.

Moreover, the present invention proposes a method for producing an above-described protective sleeve. In this method, two plastic frames are formed first, which define the locking means of the protective sleeve and comprise, as described above, the circumferential rib as well as the engagement hook(s). These plastic frames are preferably injection-molded from a hard-elastic plastic. After curing, these plastic frames are placed into molding tools together with the core in which the tubular sleeve body is to be formed. Subsequently, the plastic frames together with the core are overmolded with rubber. This overmolding substantially corresponds to the vulcanizing procedure known from tire manufacture, in which cross-linking occurs at very high temperatures and the rubber is cured. Here, the elongated tubular sleeve body is formed in the molding tool so as to have a substantially linear central portion and heads at both ends. By overmolding the plastic frames an integral connection of the plastic frames with the sleeve body is formed so that the plastic frames together with the sleeve body form a coherent unit. To remove the core, the sleeve body is expanded or widened, for example by means of compressed air that may be supplied via the core. At the same time, the core is pulled out by one of the two plastic frames in a substantially translational direction. To that end, the at least one plastic frame is configured so that the core can be guided through the circumferential rib. The engagement hooks can easily and resiliently retreat away upon pulling out of the core, as already described above. Regarding the configuration of the plastic frames with respect to the sleeve body and, thus, the core defined by the cavity of the sleeve body, reference is made to the above description of the protective sleeve itself so as to avoid repetitions.

Further advantages and features of the present invention will be appreciated from the following description of a preferred embodiment given with reference to the accompanying drawings.

BRIEF DESCRIPTION OF THE DRAWINGS

In the drawings:

FIG. 3 is a sectional view of the protective sleeve shown in FIG. 2, taken along line J-J;

FIG. 4 is an enlarged view of region O in FIG. 3;

DETAILED DESCRIPTION

Figure 1:
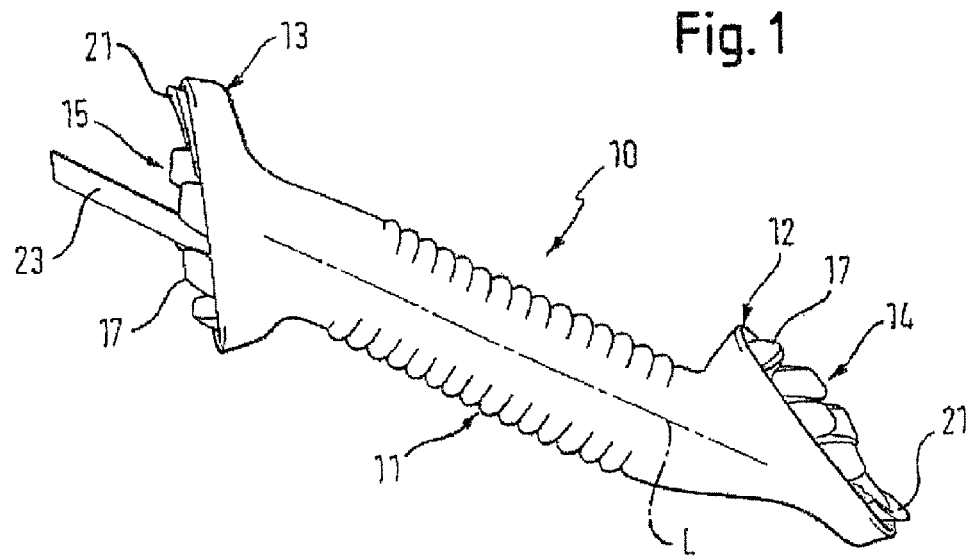
FIG. 1 is a perspective view of a protective sleeve according to the invention seen from a first direction.

In the figures, the same parts are denoted by the same reference numerals.

Figure 2:
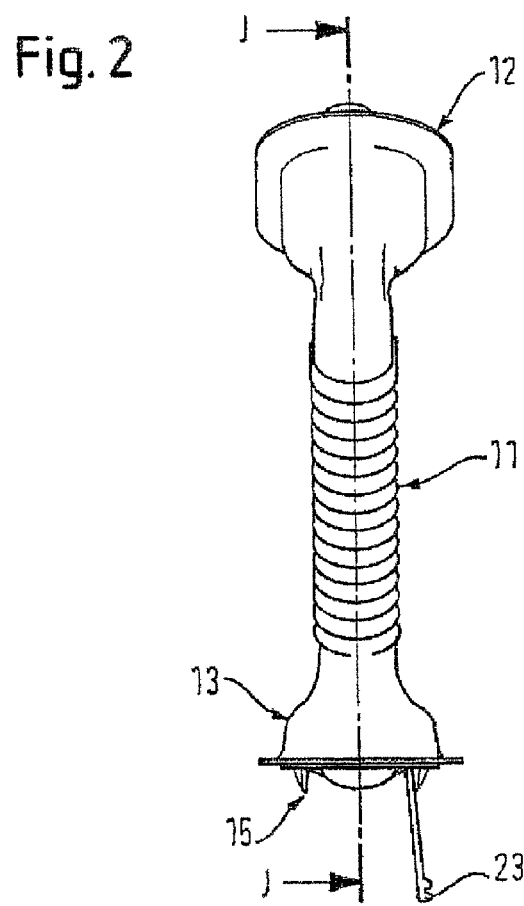
FIG. 2 is a perspective view of the protective sleeve according to the invention in FIG. 1 seen from a second direction.

FIGS. 1 and 2 show a protective sleeve according to the present invention, which is suitable for arrangement between two assembly elements and for passing through cables/lines or the like. The inventive protective sleeve in FIG. 1 comprises an elongated tubular sleeve body 10. The sleeve body 10 comprises a substantially linear central portion 11 which in the illustrated embodiment is bellows-shaped. At its two opposite ends the central portion 11 is provided with a head 12 and 13, respectively.

Moreover, locking means 14 and 15 are formed at each of the heads, respectively. The locking means 14, 15 serve to button (fix) the protective sleeve into assembly openings of the assembly elements, which preferably are openings in car body walls of a motor vehicle, for instance between door or hatch and the body work. Moreover, the locking means 14, 15 are integrally formed with the sleeve body 10 so that it is a two-component part. In other words, the locking means 14, 15 cannot be removed from the sleeve body 10 without destroying the latter, and therefore they are inseparably connected thereto.

Figure 5:
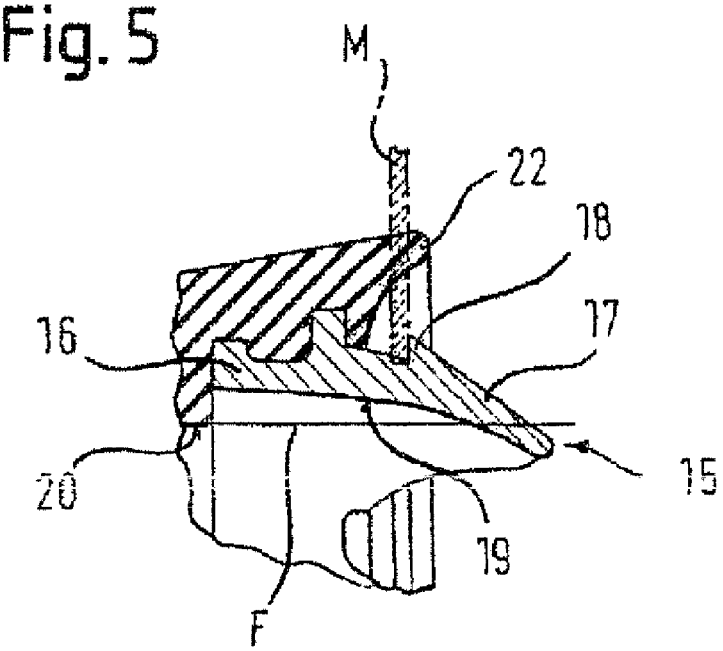
FIG. 5 is an enlarged view of region P in FIG. 3.

As can best be seen from FIGS. 4 and 5, the locking means 14, 15 comprise a circumferential rib 16. According to the illustrated embodiment, five engagement hooks 17 are formed on this rib 16, which each have a detent 18 lying radially outside. The locking means 14, 15 form an inner surface on the side opposite to the detent 18, which herein is called second inner peripheral surface 19. Moreover, as can be seen from FIG. 4, the locking means 14, 15 comprise a hang-in hook 21 which is to facilitate assembly of the protective sleeve and is arranged diametrally opposite to one of the engagement hooks.

At the open ends of heads 12, 13 an inner peripheral surface is formed, too, which will be referred to as first inner peripheral surface 20 in the following. The first inner peripheral surface 20 and the second inner peripheral surface 19 are arranged consecutively (one after the other).

The longitudinal axis of the central portion is indicated with L in the figures. In particular, it can be seen from FIGS. 1 and 3 that heads 12 or 13 are arranged so as to be inclined relative to the longitudinal axis of the central portion. In other words, the surface (sealing lip 22) of the protective sleeve, which serves as support on the assembly element M, does not run perpendicularly to the longitudinal central axis L but at a different angle and thus inclined.

Moreover, the heads 12, 13 comprise at least one circumferential sealing lip 22 which provides the seal on the assembly element M in the assembled protective sleeve in order to inhibit the passage of a medium from one side of the assembly element M to the other side. Moreover, at least one of the heads 12, 13 comprises an assembly rib 23 by means of which the protective sleeve may be preassembled and fixed onto a line (cable) set. For example, this may be effected by means of an adhesive tape. Thereby, shifting of the cable set can be avoided upon assembly, for example when passing through openings.

The inventive protective sleeve is made as a two-component part from two components of different material. Here, the sleeve body 10 is made of rubber, for instance EPDM. In contrast, the two locking means 14, 15 at both heads 12, 13 are made of a hard-elastic plastic, preferably a high temperature resistant plastic such as polyamide reinforced with 14% of glass fibers. Such a plastic is available as Zytel® 80G14 from DuPont.

Figure 6:
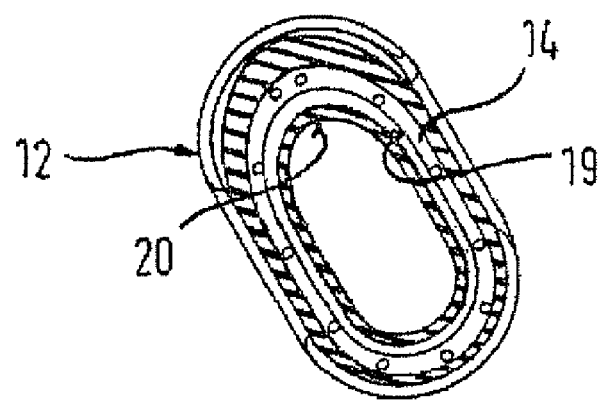
FIG. 6 is a sectional view, taken along line D-D in FIG. 3.

The inventive protective sleeve is manufactured by injection molding the locking means (14, 15) in a first step. The finished and cured parts are subsequently introduced as so-called inserts into a mold and are then overmolded with rubber. This is effected at temperatures between 180 and 200° C. so that the rubber can be cross-linked. This corresponds to a conventional vulcanizing process. In order to form the elongated tubular sleeve body, a core has to be provided in the mold which will be overmolded with rubber material. After the production and curing of the rubber, this core has to be removable in an easy and cost effective manner. The core must be passed through at least one of the locking means. To make this possible, the cross-section of the at least one locking means, on the one hand, is configured to be larger than the maximum cross-section of the sleeve body 10 in which the core is situated. This means that the cross section of the core is at no point larger than the cross-section of the locking means through which the core is pulled out. Moreover, the second inner peripheral surface 19 of the at least one locking means or its rib 16, but preferably of both, are configured so that they run radially outside of the alignment of the first inner peripheral surface 20 at the heads 12 and 13 of the sleeve body 10, respectively. The alignment of the first inner peripheral surface 20 is exemplified in FIGS. 4 and 5 and is denoted by the letter F. In particular, the inner peripheral surface of the heads is formed by the portion running parallel to the longitudinal axis L. Moreover, it is important that the interface between the inner peripheral surface of the respective head 12 or 13 and the inner peripheral surface 19 of the respective locking means 14 or 15 the inner peripheral surface 19 is arranged so as to be radially offset to the outside. In the illustrated embodiment, this radial offset is 2 mm. Further, the first and second inner peripheral surfaces have substantially the same cross-sectional shape. As shown in FIG. 6, the cross-section is configured to be elliptical or oval, wherein the cross-section of the second inner peripheral surface is configured to be larger by the radial offset. This configuration results in a substantially smooth transition between the inner peripheral surfaces at the interface.

As can be seen from FIG. 5, the alignment F of the first inner peripheral surface 20 intersects the engagement hook 17. However, the latter is formed elastically so that it can resiliently retreat radially to the outside upon removing the core.

By means of the above-described configuration, the core can be pulled substantially in a translational way in the direction of the longitudinal axis L through the locking means, in this case 15, and out of the sleeve body 10.

As it is an elliptical cross-section as shown for example in FIG. 6, only the portions of the second inner peripheral surface 19 have to be arranged so as to be radially offset to the outside and aligned with respect to the first inner peripheral surface 20, which portions are arranged at the left-hand and right-hand side in the Figure. The portions of the cross-section arranged in front and behind the paper plane do not have to be configured so as to be radially offset to the outside and aligned, however, but they can merely be arranged radially outside of the alignment.

The inventive configuration thus makes it possible to develop a protective sleeve having a sleeve body provided with heads at both sides, wherein the sleeve body is made of rubber and the locking means attached at both ends are made from a hard-elastic plastic, wherein the core necessary in the production can be removed after curing of the rubber in an easy and straightforward way and, at the same time, sufficient holding forces can be achieved also with heads that are arranged in an inclined way. Consequently, the present invention allows to combine the advantages of the protective sleeves mentioned at the beginning.

The invention claimed is:

1. A protective sleeve to be arranged between two assembly elements for passing through cables or lines in a protected fashion, comprising
an elongated tubular sleeve body having a substantially linear central portion and heads at the ends, wherein the heads are inclined relative to a longitudinal axis of the central portion, wherein the heads form a first inner peripheral surface at their open ends; and
a locking means for buttoning the protective sleeve into assembly openings of the assembly elements at each of the heads and being integrally formed therewith, which comprises a circumferential rib having at least one engagement hook formed thereon, which hook comprises at least one detent lying radially outside, wherein the rib forms a second inner peripheral surface opposite to the detent,
wherein
the sleeve body is made of rubber and the locking means are made of hard-elastic plastic; and
at least one of the second inner peripheral surfaces is configured so that it runs radially outside of the alignment of the corresponding first inner peripheral surface.

2. The protective sleeve of claim 1, in which the second inner peripheral surface is configured so as to be radially offset to the outside and in alignment with the corresponding first inner peripheral surface.

3. The protective sleeve of claim 1, in which the sleeve body is configured so as to have a flat, preferably oval cross-section and at least the portions of the second inner peripheral surface corresponding to the shorter or longer sides of the flat cross-section are radially offset to the outside and in alignment with the corresponding portions of the corresponding first inner peripheral surface.

4. The protective sleeve of claim 3, in which the engagement hook is formed on a portion of the rib forming the portions of the second inner peripheral surface corresponding to the shorter or longer sides.

5. The protective sleeve of claim 4, in which at least one hang-in hook diametrically opposite to the engagement hook is provided.

6. The protective sleeve of claim 1, in which the radial offset is between 1.5 and 2.5 mm.

7. The protective sleeve of claim 1, in which the second inner peripheral surface runs substantially in parallel to the longitudinal axis of the central portion.

8. The protective sleeve of claim 1, in which the hard-elastic plastic is polyamide reinforced with 14% of glass fiber.

9. The protective sleeve of claim 1, in which the heads form at their open ends at least one sealing lip extending circumferentially and radially outside of the rib.

10. Method of production of a protective sleeve, comprising the following steps:
introducing at least two plastic frames forming the locking means of the protective sleeve and made of hard-elastic plastic into a molding tool together with the core,
overmolding the plastic frames and the core with rubber so as to form an elongated tubular sleeve body having a substantially linear central portion and heads at both ends, wherein the heads are inclined relative to a longitudinal axis of the central portion, wherein the plastic frames are formed integrally with the sleeve body at its heads,
expanding the sleeve body, and at the same time, removing the core through one of the plastic frames, to which end the at least one plastic frame is configured such that the core can be pulled out in a substantially translational movement.

* * * * *